(12) United States Patent
Na

(10) Patent No.: US 10,949,625 B2
(45) Date of Patent: Mar. 16, 2021

(54) MACHINE TRANSLATION METHOD AND APPARATUS

(71) Applicant: Samsung Electronics Co., Ltd., Suwon-si (KR)

(72) Inventor: Hwidong Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 16/007,073

(22) Filed: Jun. 13, 2018

(65) Prior Publication Data

US 2019/0155909 A1    May 23, 2019

(30) Foreign Application Priority Data

Nov. 23, 2017  (KR) .......................... 10-2017-0157285

(51) Int. Cl.
| | |
|---|---|
| *G06F 40/40* | (2020.01) |
| *G06F 40/58* | (2020.01) |
| *G06F 40/44* | (2020.01) |
| *G10L 15/18* | (2013.01) |

(52) U.S. Cl.
CPC .............. *G06F 40/58* (2020.01); *G06F 40/44* (2020.01); *G06F 40/40* (2020.01); *G10L 15/1815* (2013.01)

(58) Field of Classification Search
CPC ............................. G06F 40/40; G10L 15/1815
See application file for complete search history.

(56) References Cited

U.S. PATENT DOCUMENTS

| | | | |
|---|---|---|---|
| 9,569,526 | B2 | 2/2017 | Sawaf |
| 2007/0016397 | A1 | 1/2007 | Lu et al. |
| 2009/0204386 | A1* | 8/2009 | Seligman .............. G06F 40/268 |
| | | | 704/2 |
| 2009/0281789 | A1* | 11/2009 | Waibel .................... G06F 40/40 |
| | | | 704/3 |
| 2010/0004920 | A1 | 1/2010 | Macherey et al. |
| 2016/0282255 | A1 | 9/2016 | Irimia et al. |
| 2016/0306794 | A1 | 10/2016 | Huang et al. |

FOREIGN PATENT DOCUMENTS

| | | |
|---|---|---|
| KR | 10-2016-0052506 A | 5/2016 |
| KR | 10-1626386 B1 | 6/2016 |

(Continued)

OTHER PUBLICATIONS

Li, Jiwei, et al., "Mutual Information and Diverse Decoding Improve Neural Machine Translation", *arXiv preprint arXiv:1601.00372*, Mar. 22, 2016 (10 pages in English).

(Continued)

*Primary Examiner* — Feng-Tzer Tzeng
(74) *Attorney, Agent, or Firm* — NSIP Law

(57) ABSTRACT

A machine translation method includes translating a source sentence using a first model, determining a back-translation probability of a translation result of the source sentence being back-translated into the source sentence using a second model, applying the back-translation probability to context information extracted from the source sentence in the first model, and retranslating the source sentence using the first model and the context information to which the back-translation probability is applied.

23 Claims, 10 Drawing Sheets

(56) References Cited

FOREIGN PATENT DOCUMENTS

| KR | 10-2016-0081244 A | 7/2016 |
| KR | 10-2016-0138837 A | 12/2016 |

OTHER PUBLICATIONS

Tu, Zhaopeng, et al., "Neural Machine Translation with Reconstruction", *Thirty-First AAAI Conference on Artificial Intelligence*, Nov. 21, 2016 (7 pages in English).

Goto, Isao et al., "Detecting Untranslated Content for Neural Machine Translation", *Proceedings of the First Workshop on Neural Machine Translation*, Aug. 2017 (pp. 47-55).

Extended European Search Report dated Mar. 20, 2019 in counterpart European Patent Application No. 18188542.7 (12 pages in English).

Papineni, Kishore et al., "BLEU: a Method for Automatic Evaluation of Machine Translation", *Proceedings of the 40$^{th}$ Annual Meeting of the Association for Computational Linguistics (ACL)*, Philadelphia, Jul. 2002 (pp. 311-318).

Y. Xia et al., "Dual Learning for Machine Translation," arXiv:1611.00179v1 [cs.CL], Nov. 1, 2016, pp. 1-9 (revised version published in Advances in Neural Information Processing Systems 29: 30th Annual Conference on Neural Information Processing Systems (NIPS 2016), 2016, pp. 820-828, Curran Associates, Inc., Red Hook, N.Y., conference held Dec. 5-10, 2016, in Barcelona, paper presented as poster on Dec. 6, 2016).

\* cited by examiner

MACHINE TRANSLATION METHOD AND APPARATUS

CROSS-REFERENCE TO RELATED APPLICATIONS

This application claims the benefit under 35 USC 119(a) of Korean Patent Application No. 10-2017-0157285 filed on Nov. 23, 2017, in the Korean Intellectual Property Office, the entire disclosure of which is incorporated herein by reference for all purposes.

BACKGROUND

1. Field

The following description relates to a machine translation method and apparatus.

2. Description of Related Art

A user may use machine translation to translate a sentence, a paragraph, a phrase, or a word expressed in a language different from a native language of the user. However, when an error occurs as a result of the machine translation, the user may not readily and correctly understand the result of the machine translation. Thus, correctly translating a sentence in another language may be important.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented machine translation method includes translating a source sentence using a first model; determining a back-translation probability of a translation result of the source sentence being back-translated into the source sentence using a second model; applying the back-translation probability to context information extracted from the source sentence in the first model; and retranslating the source sentence using the first model and the context information to which the back-translation probability is applied.

The back-translation probability may be determined for each of words included in the source sentence.

The applying of the back-translation probability to the context information may include applying, to the context information, a greater weight for a word having a lower back-translation probability among words included in the source sentence.

The applying of the back-translation probability to the context information may include applying, to the context information for each of words included in the source sentence, a weight determined based on a back-translation probability of a corresponding word included in the translation result and location information of the corresponding word in the translation result.

The applying of the back-translation probability to the context information may include applying a greater weight for a word having a lower back-translation probability among the words included in the source sentence to context information to be used to translate the word using the first model.

The processor-implemented machine translation method may further include determining whether a last translation result of the source sentence needs to be corrected; and in response to a result of the determining being that the last translation result of the source sentence needs to be corrected, applying, to the context information, a back-translation probability of the last translation result being back-translated into the source sentence, and retranslating the source sentence using the first model and the context information to which the back-translation probability is applied.

The determining of whether the last translation result needs to be corrected may include determining whether the last translation result needs to be corrected based on a difference between the last translation result of the source sentence and a previous translation result of the source sentence.

The applying of the back-translation probability to the context information may include providing a user with the back-translation probability for each of words included in the source sentence; receiving, from the user, a user input to change a weight for a word among the words included in the source sentence; and applying, to the context information, the changed weight for the word in response to the received user input.

The translation result may include a plurality of target sentences obtained by translating the source sentence using the first model, and the determining of the back-translation probability may include determining, to be the back-translation probability, a mean value of respective probabilities of the target sentences being back-translated into the source sentence.

The first model and the second model may be trained to maximize an expected reward that increases as a number of times the source sentence is retranslated decreases.

The first model and the second model may be trained to maximize an expected reward that increases as a number of times the source sentence is retranslated decreases and as a degree of naturalness of the translation result in a target language increases.

The first model may be configured to generate a translation result expressed in a target language from a source sentence expressed in a source language, and the second model may be configured to generate a back-translation probability of the translation result expressed in the target language being back-translated into the source sentence expressed in the source language.

In another general aspect, a non-transitory computer-readable medium stores instructions that, when executed by a processor, cause the processor to perform the processor-implemented machine translation method described above.

In another general aspect, a machine translation apparatus includes a processor; and a memory storing at least one instruction to be executed by the processor, wherein the processor executing the at least one instruction configures the processor to translate a source sentence using a first model; determine a back-translation probability of a translation result of the source sentence being back-translated into the source sentence using a second model; apply the back-translation probability to context information extracted from the source sentence in the first model; and retranslate the source sentence using the first model and the context information to which the back-translation probability is applied.

The processor may be further configured to determine the back-translation probability for each of words included in the source sentence.

The processor may be further configured to apply, to the context information, a greater weight for a word having a lower back-translation probability among words included in the source sentence.

The processor may be further configured to apply, to the context information for each of words included in the source sentence, a weight determined based on a back-translation probability of a corresponding word included in the translation result and location information of the corresponding word in the translation result.

The processor may be further configured to apply a greater weight for a word having a lower back-translation probability among the words included in the source sentence to context information to be used to translate the word using the first model.

The processor may be further configured to determine whether a last translation result of the source sentence needs to be corrected; and in response to a determination that the last translation result needs to be corrected, apply, to the context information, a back-translation probability of the last translation result being back-translated into the source sentence, and retranslate the source sentence using the first model and the context information to which the back-translation probability is applied.

The processor may be further configured to provide a user with the back-translation probability for each of words included in the source sentence; receive, from the user, a user input to change a weight for a word among the words included in the source sentence; and apply, to the context information, the changed weight for the word in response to the received user input.

In another general aspect, a processor-implemented machine translation method includes translating a source sentence including words based on context information of the words of the source sentence using a first model to obtain a target sentence; determining a back-translation probability of the target sentence being back-translated into the source sentence using a second model; applying the back-translation probability to the context information to obtain modified context information; and retranslating the source sentence based on the modified context information using the first model to obtain an updated target sentence.

The target sentence may include words, the determining of the back-translation probability may include determining, for each of the words of the source sentence, a back-translation probability of a corresponding word of the target sentence being back-translated into the word of the source sentence, and the applying of the back-translation probability may include applying an inverse of the back-translation probability determined for each of the words of the source sentence to the context information to obtain the modified context information.

The target sentence may include words, the determining of the back-translation probability may include determining, for each of the words of the source sentence, a back-translation probability of a corresponding word of the target sentence being back-translated into the word of the source sentence, and the applying of the back-translation probability may include applying, for each of the words of the source sentence, the back-translation probability determined for the word of the source sentence and location information of the corresponding word of the target sentence to the context information to obtain the modified context information.

The translating of the source sentence may include translating the source sentence based on the context information using the first model to obtain a first target sentence and a second target sentence different from the first target sentence, the determining of the back-translation probability may include determining a first back-translation probability of the first target sentence being back-translated into the source sentence using the second model, and determining a second back-translation probability of the second target sentence being back-translated into the source sentence using the second model, and the applying of the back-translation probability may include applying a mean value of the first back-translation probability and the second back-translation probability to the context information to obtain the modified context information.

The processor-implemented machine translation method may further including determining whether a difference between the updated target sentence and the source sentence satisfies a predetermined condition indicating that the updated target sentence is a sufficiently accurate translation of the source sentence; in response to the difference not satisfying the predetermined condition, repeating the determining of the back-translation probability, the applying of the back-translation probability, the retranslating of the source sentence, and the determining of whether the difference satisfies the predetermined condition until the difference satisfies the predetermined condition; and in response to the difference satisfying the predetermined condition, outputting the updated target sentence as a final translation result of translating the source sentence.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
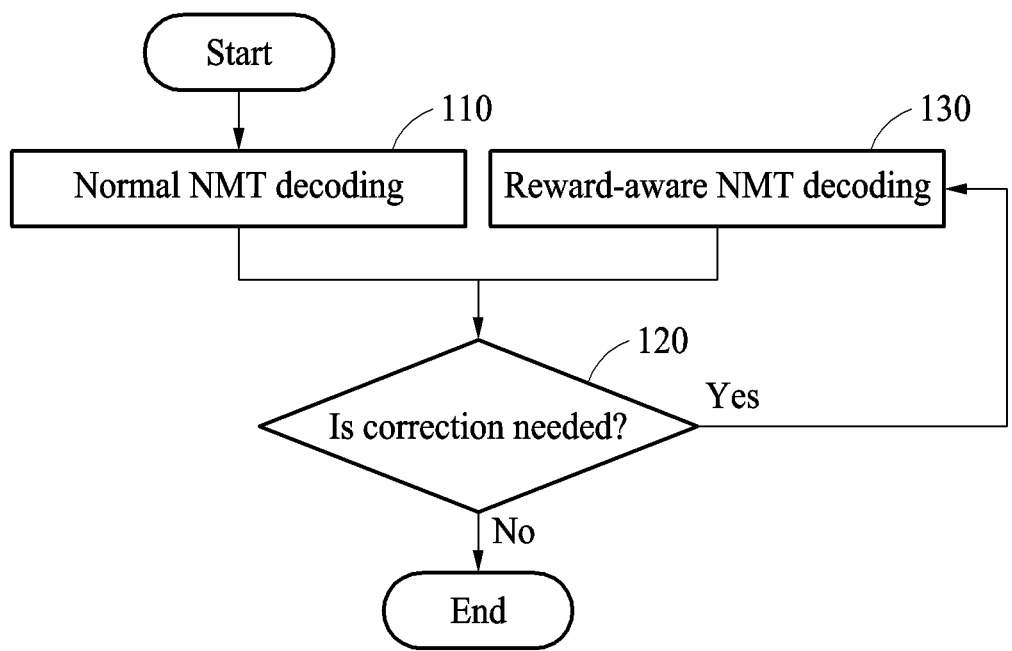
FIG. 1 is a flowchart illustrating an example of an overall operation of a machine translation apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 is a flowchart illustrating an example of an overall operation of a machine translation apparatus.

A machine translation apparatus described herein translates a source sentence into a target sentence. The machine translation apparatus uses a neural machine translation (NMT) model. The NMT model encodes the source sentence and generates the target sentence through decoding, and detailed operations of the NMT model will be described with reference to FIG. 2.

Referring to FIG. 1, in operation 110, the machine translation apparatus generates a target sentence through normal NMT decoding of an encoded source sentence. Normal NMT decoding is a decoding process of the NMT model in which other parameters are not applied to a weight or context information that is used in a translation process. The target sentence generated in operation 110 is an initial translation result.

In operation 120, the machine translation apparatus determines whether the generated target sentence needs to be corrected. The machine translation apparatus uses a previously generated target sentence to determine whether the target sentence needs to be corrected. However, in a case in which a current target sentence is an initial translation result and a previous target sentence is thus not present, the machine translation apparatus determines that the current target sentence needs to be corrected.

In operation 130, the machine translation apparatus regenerates a target sentence through reward-aware NMT decoding. The machine translation apparatus determines a back-translation probability of the target sentence being back-translated into the source sentence, applies the determined back-translation probability to context information extracted from the source sentence, and regenerates the target sentence from the source sentence using the context information to which the back-translation probability is applied. The reward-aware NMT decoding is a decoding process of the NMT model that uses context information to which a back-translation probability is applied.

The machine translation apparatus retranslates the source sentence using the back-translation probability of the target sentence being back-translated into the source sentence so that a word in the source sentence that is not sufficiently accurately translated in the currently generated target sentence will be more accurately translated in the next translation.

In operation 120, when the target sentence is regenerated, the machine translation apparatus determines whether the regenerated target sentence needs to be corrected. The machine translation apparatus determines whether the regenerated target sentence needs to be corrected based on a difference between the regenerated target sentence and the previously generated target sentence.

In response to the difference between the regenerated target sentence and the previously generated target sentence being greater than a preset threshold value, the machine translation apparatus determines that the regenerated target sentence needs to be corrected. In response to such a determination, operation 130 is performed again based on the back-translation probability of the regenerated target sentence being back-translated into the source sentence.

Conversely, in response to the difference between the regenerated target sentence and the previously generated target sentence being equal to or less than the threshold value, the machine translation apparatus determines that the regenerated target sentence does not need to be corrected. In response to such a determination, the machine translation apparatus outputs a most recently regenerated target sentence as a final translation result.

Thus, as described above, the machine translation apparatus may regenerate a target sentence a plurality of times, thereby gradually enhancing a translation accuracy.

Figure 2:
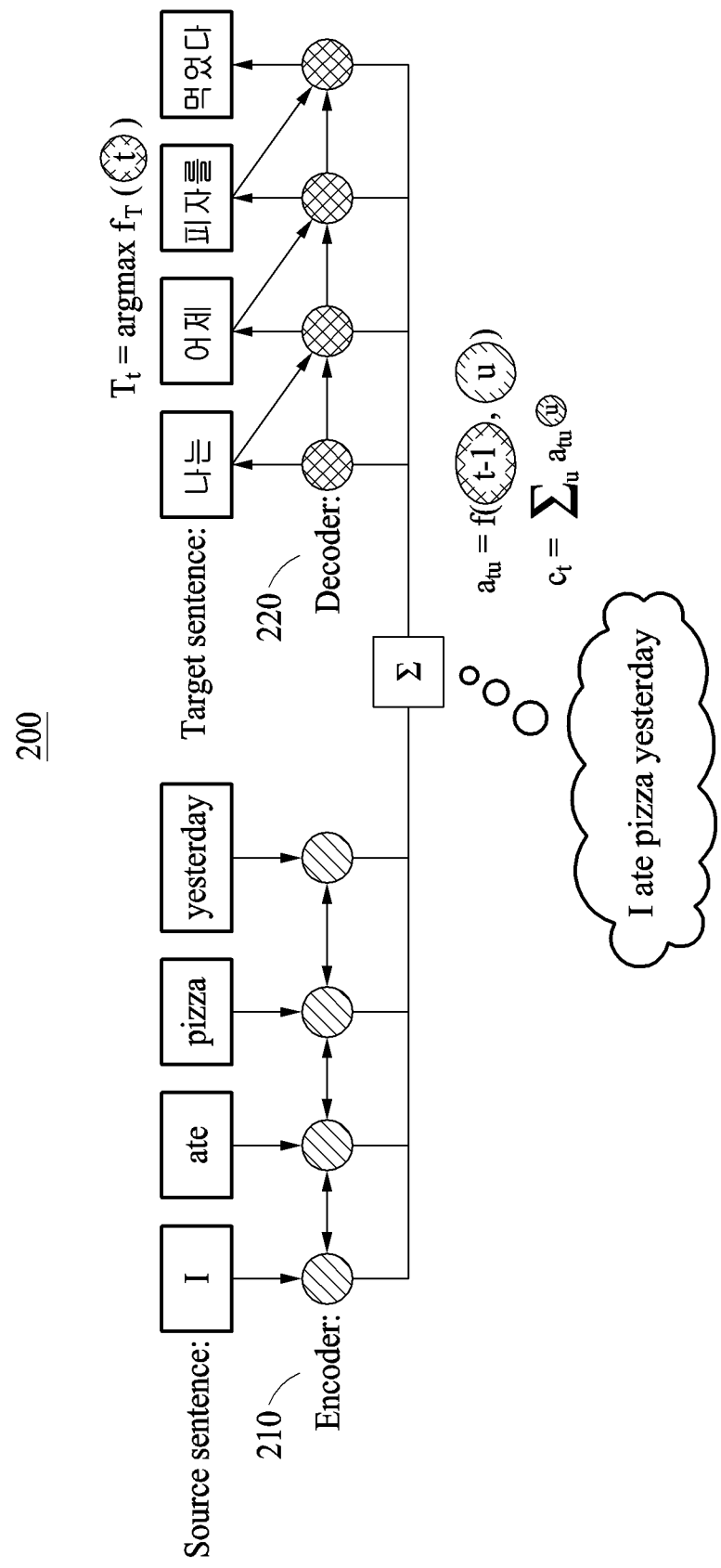
FIG. 2 is a diagram illustrating an example of operations of a neural machine translation (NMT) model.

FIG. 2 is a diagram illustrating an example of operations of an NMT model.

Referring to FIG. 2, an NMT model 200 includes an encoder 210 configured to encode a source sentence, and a decoder 220 configured to decode a result of the encoding into a target sentence. The encoder 210 and the decoder 220 are based on a neural network.

As illustrated in FIG. 2, the encoder 210 converts, to a hidden vector, each of words included in the source sentence, for example, "I," "ate," "pizza," and "yesterday." In the example illustrated in FIG. 2, ⊙ denotes a hidden vector of the encoder 210 that is obtained by converting a u-th word in the source sentence, where u denotes location information, or an index, of the u-th word in the source sentence.

The hidden vector of the encoder 210, or the u-th word in the source sentence, is applied to context information $c_t$ as a weight $a_{tu}$. The weight $a_{tu}$ indicates how much the hidden vector for the u-th word in the source sentence contributes to determining a t-th word in the target sentence. The weight $a_{tu}$ is determined based on a hidden vector of the decoder 220 for a (t−1)-th word in the target sentence and the hidden vector of the encoder 210 for the u-th word in the source sentence. The weight $a_{tu}$ may also be referred to as an attention value.

The context information $c_t$ is determined using hidden vectors of the encoder 210 and weights $a_{tu}$. The context information $c_t$ is determined to be a sum of results, or products, of multiplication between each of the hidden vectors and a corresponding weight $a_{tu}$.

The decoder 220 determines the t-th word in the target sentence using the context information $c_t$ and the (t−1)-th word in the target sentence. In the example illustrated in FIG. 2, ⊕ denotes a hidden vector of the decoder 220 for the t-th word in the target sentence, where t denotes location information, or an index, of the t-th word in the target sentence.

The machine translation apparatus applies, to the context information $c_t$, a back-translation probability of the target sentence being back-translated into the source target sentence to translate the source sentence again, and thus gradually enhances accuracy in translating a word in the source sentence that is not sufficiently accurately translated in the current target sentence.

Figure 3:
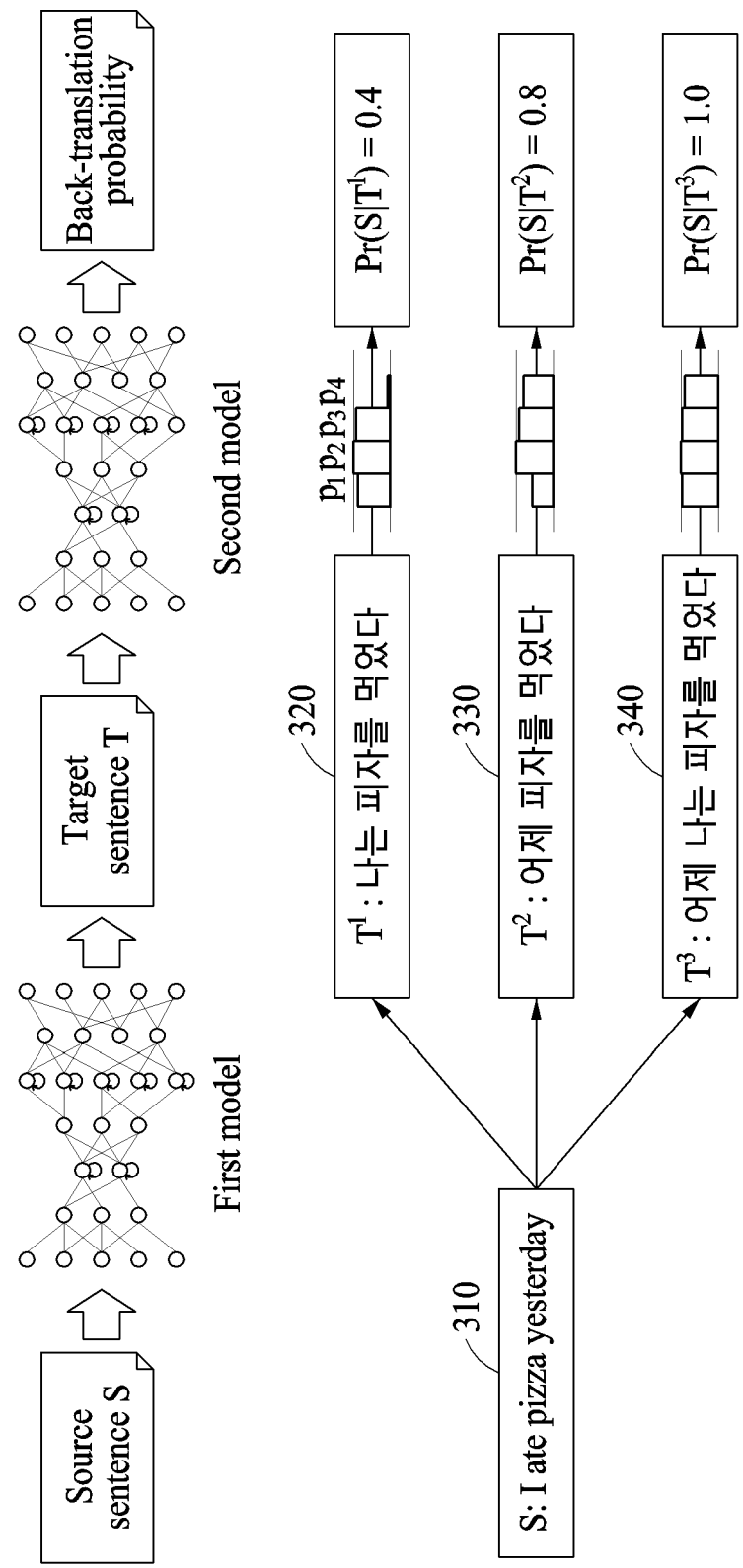
FIG. 3 is a diagram illustrating an example of a first model and a second model used in a machine translation apparatus.

FIG. 3 is a diagram illustrating an example of a first model and a second model used in a machine translation apparatus.

Referring to FIG. 3, a machine translation apparatus translates a source sentence S 310, for example, "I ate pizza yesterday," as illustrated in FIG. 3.

The machine translation apparatus generates a first target sentence $T^1$ 320 by translating the source sentence S 310 using a first model. The first model is an NMT model configured to generate a target sentence T expressed in a target language from the source sentence S 310 expressed in a source language.

The machine translation apparatus determines a back-translation probability of the first target sentence $T^1$ 320 being back-translated into the source sentence S 310 using a second model. The second model used is an NMT model configured to output a back-translation probability of the source sentence S 310 expressed in the source language being generated from the target sentence T expressed in the target language. In the example illustrated in FIG. 3, Pr(S|$T^1$) denotes a back-translation probability that the first target sentence $T^1$ 320 is back-translated into the source sentence S 310.

A back-translation probability is determined for each of words included in the source sentence S 310 using the second model. For example, as illustrated in FIG. 3, back-translation probabilities $p_1$, $p_2$, $p_3$, and $p_4$, are determined for "I," "ate," "pizza," and "yesterday," respectively. The back-translation probabilities $p_1$, $p_2$, $p_3$, and $p_4$ have respective values between 0 and 1, and are represented by a bar graph as illustrated in FIG. 3.

In a case of the first target sentence $T^1$ 320, the back-translation probability $p_4$ of the word "yesterday" is significantly lower than the other back-translation probabilities $p_1$, $p_2$, and $p_3$, which indicates that the word "yesterday" among the words included in the source sentence S 310 is not sufficiently accurately translated in the first target sentence $T^1$ 320.

The machine translation apparatus then retranslates the source sentence S 310 by increasing a weight for the word "yesterday" among the words included in the source sentence S 310 based on the determined back-translation probability. The first model is used again to perform the retranslation, and a second target sentence $T^2$ 330 is generated by retranslating the word "yesterday" based on the increased weight when the source sentence S 310 is retranslated in the first model.

The machine translation apparatus determines a back-translation probability of the second target sentence $T^2$ 330 being back-translated into the source sentence S 310 using the second model. In a case of the second target sentence $T^2$ 330, the back-translation probability $p_4$ of the word "yesterday" has increased considerably from its previous value, whereas the back-translation probability $p_1$ of the word "I" has decreased slightly from its previous value, which indicates that the word "yesterday" is now sufficiently accurately translated in the second target sentence $T^2$ 330 but the word "I" is not sufficiently accurately translated in the second target sentence $T^2$ 330.

The machine translation apparatus retranslates the source sentence S 310 by increasing a weight for the word "I" among the words included in the source sentence S 310 based on the currently determined back-translation probability. The first model is used again to perform the retranslation, and a third target sentence $T^3$ 340 is generated. The machine translation apparatus then determines a back-translation probability of the third target sentence $T^3$ 340 being back-translated into the source sentence S 310 using the second model.

As discussed above, the machine translation apparatus translates the source sentence S 310 a plurality of times, and thus obtains a target sentence with a gradually increased accuracy. Hereinafter, a target sentence will also be referred to as a translation result for convenience of description.

Figure 4:
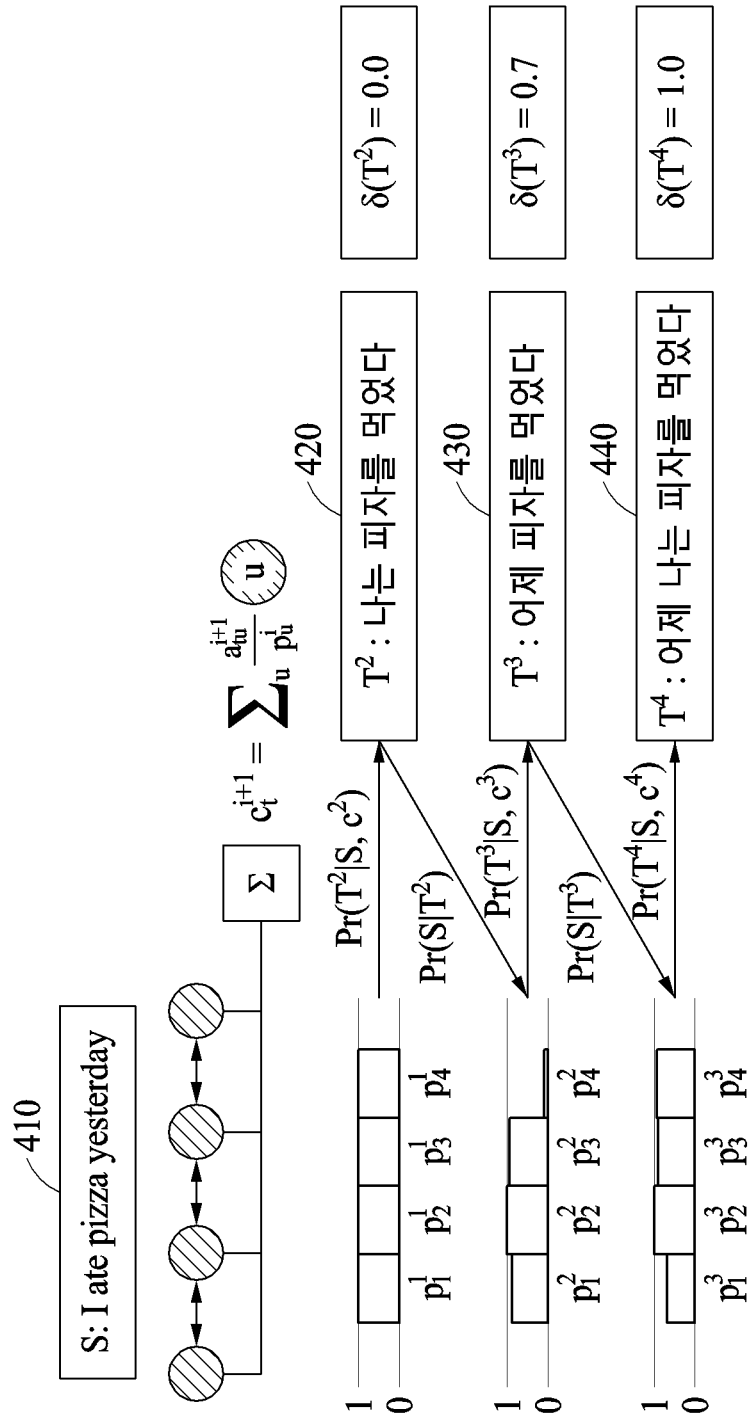
FIGS. 4 through 6 are diagrams illustrating examples of operations of a machine translation apparatus.
Figure 5:
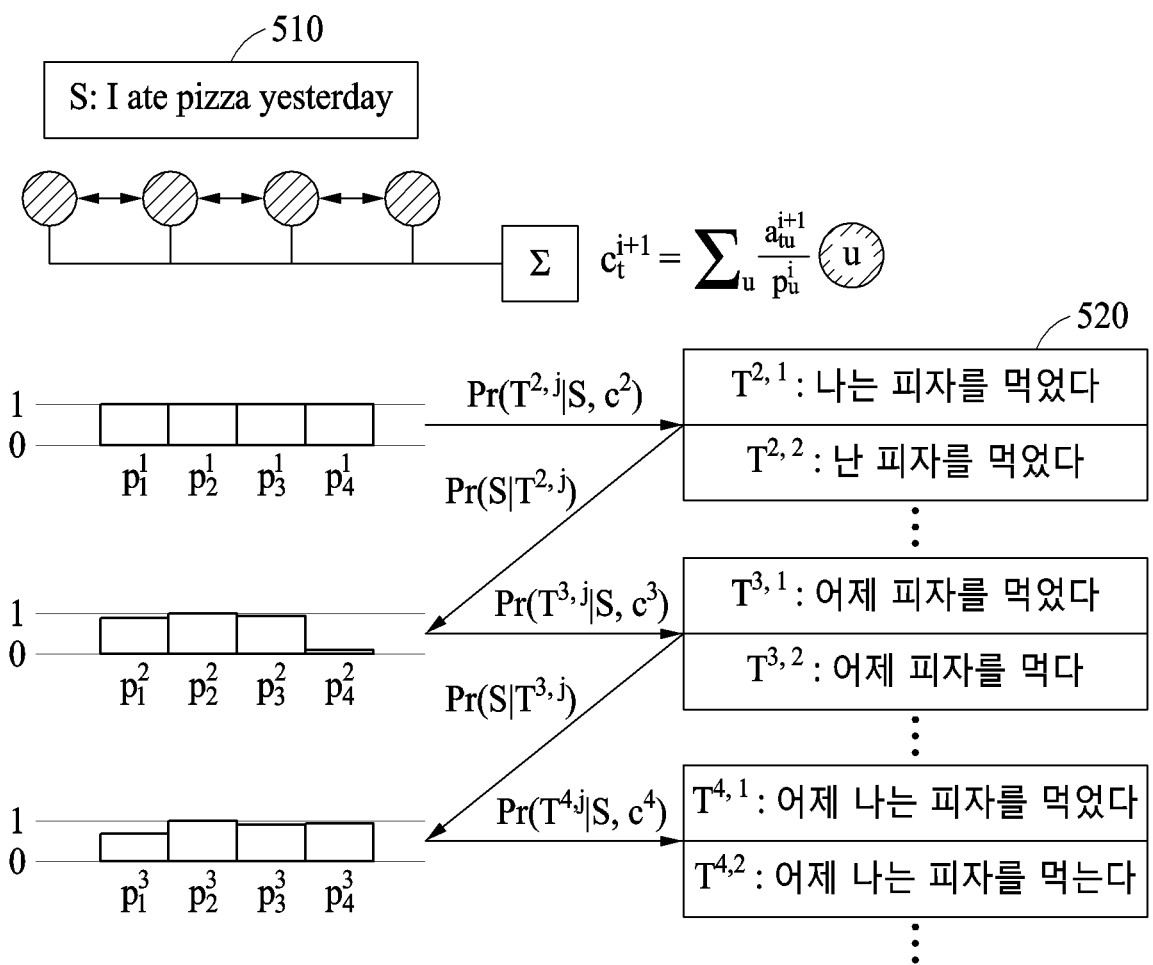
Figure 6:
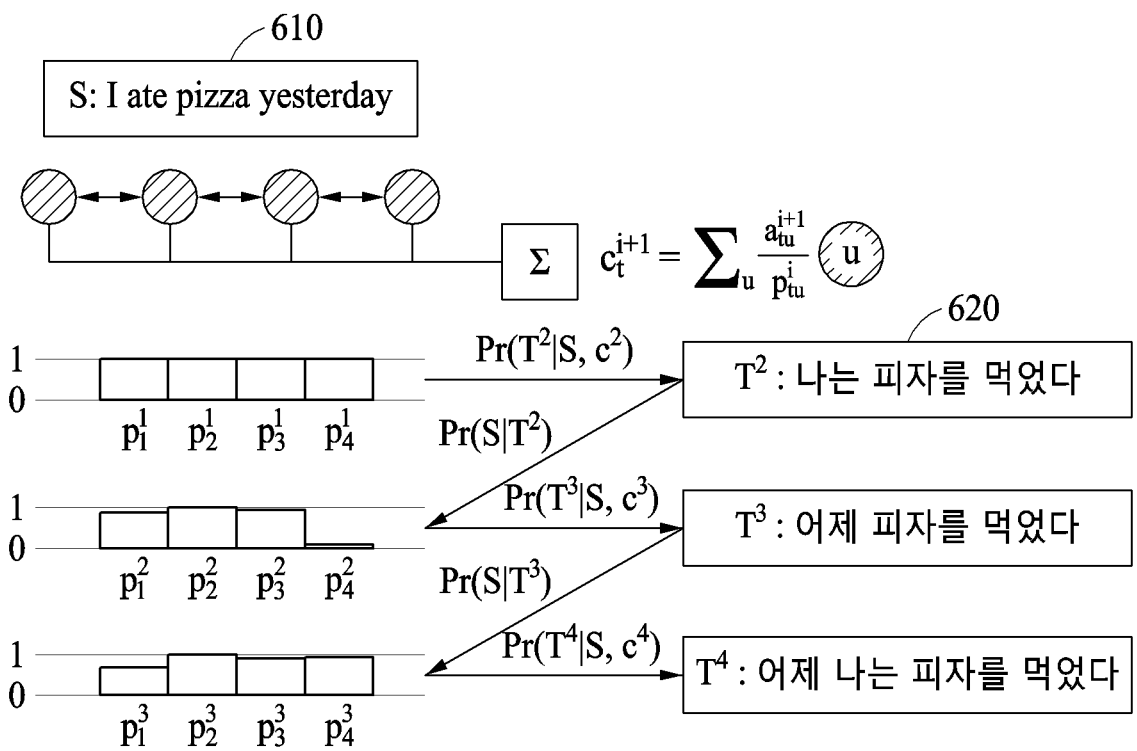

FIGS. 4 through 6 are diagrams illustrating examples of operations of a machine translation apparatus.

FIG. 4 is a diagram illustrating an example of how a machine translation apparatus performs translation by applying a back-translation probability to context information.

Referring to FIG. 4, a machine translation apparatus generates a first target sentence $T^2$ 420 by translating a source sentence S 410, for example, "I ate pizza yesterday" as illustrated in FIG. 4, using a first model. There is no target sentence present when initially translating the source sentence S 410, and thus the machine translation apparatus performs the translation under the assumption that initial back-translation probabilities of all of words included in the source sentence S 410, for example, $p_1^1$, $p_2^1$, $p_3^1$, and $p_4^1$ as illustrated in FIG. 4, are 1. That is, it is assumed that a virtual target sentence $T^1$ (not illustrated) is present. In the example illustrated in FIG. 4, Pr($T^2$|S, $c^2$) denotes a probability of the first target sentence $T^2$ 420 being generated when the source sentence S 410 and context information $c^2$ are given.

The machine translation apparatus then determines whether the first target sentence $T^2$ 420 needs to be corrected. For example, as illustrated in FIG. 4, the machine translation apparatus determines whether the first target sentence $T^2$ 420 needs to be corrected based on a difference between the first target sentence $T^2$ 420, which is a current translation result, and a previous target sentence. However, since the first target sentence $T^2$ 420 is an initial translation result, there is no previous target sentence, so the machine translation apparatus determines that the first target sentence $T^2$ 420 needs to be corrected.

The machine translation apparatus determines a back-translation probability of the first target sentence $T^2$ 420 being back-translated into the source sentence S 410 using a second model. A back-translation probability for each of words included in the source sentence S 410, for example, $p_1^2$, $p_2^2$, $p_3^2$, and $p_4^2$ as illustrated in FIG. 4, is determined. In the example illustrated in FIG. 4, $Pr(S|T^2)$ denotes the back-translation probability of the first target sentence $T^2$ 420 being back-translated into the source sentence S 410.

The machine translation apparatus applies the determined back-translation probabilities to context information according to Equation 1 below.

$$c_t^{i+1} = \sum_u \frac{a_{tu}^{i+1}}{p_u^i}(u) \qquad (1)$$

In Equation 1, $c_t^{i+1}$ denotes context information used to determine a t-th word in a target sentence in an i-th translation step. $a_{tu}^{i+1}$ denotes an attention value indicating how much a u-th word in the source sentence S 410 contributes to determining the t-th word in the target sentence in the i-th translation step. $p_u^i$ denotes a back-translation probability associated with the u-th word in the source sentence S 410 in the i-th translation step.

As can be seen from Equation 1, an inverse of a back-translation probability is multiplied by the remaining terms so that a smaller back-translation probability has a greater effect on context information. That is, the machine translation apparatus applies, to context information, a greater weight for a word having a smaller back-translation probability among the words included in the source sentence S 410.

In the example illustrated in FIG. 4, the back-translation probability $p_4^2$ of the word "yesterday" is near 0. An inverse of the back-translation probability $p_4^2$ is multiplied by the remaining terms so that the word "yesterday" in the source sentence S 410 is reflected in the context information with a greater weight.

As discussed above, the machine translation apparatus retranslates the source sentence S 410 using the first model and the context information to which the back-translation probability is applied. As a result of the retranslating, a second target sentence $T^3$ 430 is generated.

The machine translation apparatus then determines whether the second target sentence $T^3$ 430 needs to be corrected. For example, as illustrated in FIG. 4, the machine translation apparatus determines whether the second target sentence $T^3$ 430 needs to be corrected based on a difference between the second target sentence $T^3$ 430, which is a current translation result or a last translation result, and a previous target sentence, which in this example is the first target sentence $T^2$ 420.

In one example, in response to the difference between the second target sentence $T^3$ 430 and the previous target sentence being less than or equal to a preset threshold value, the machine translation apparatus determines that the second target sentence $T^3$ 430 does not need to be corrected and outputs the second target sentence $T^3$ 430 as a final translation result. Conversely, in response to the difference between the second target sentence $T^3$ 430 and the previous target sentence being greater than the threshold value, the machine translation apparatus determines that the second target sentence $T^3$ 430 needs to be corrected.

Alternatively, in another example, in response to the difference between the second target sentence $T^3$ 430 and the previous target sentence being less than the preset threshold value, the machine translation apparatus determines that the second target sentence $T^3$ 430 does not need to be corrected and outputs the second target sentence $T^3$ 430 as a final translation result. Conversely, in response to the difference between the second target sentence $T^3$ 430 and the previous target sentence being equal to or greater than the threshold value, the machine translation apparatus determines that the second target sentence $T^3$ 430 needs to be corrected.

In one example, a difference between a current translation result and a previous translation result is determined according to Equation 2 below based on a bilingual evaluation understudy (BLEU) score, which is a translation evaluation index.

$$\delta(T^i) = BLEU(T^i, T^{<i}) \qquad (2)$$

In Equation 2, $T^i$ denotes a current target sentence, and $T^{<i}$ denotes all previous target sentences that that have been generated. $\delta(T^i)$ denotes a difference between the current target sentence and a previous target sentence based on the BLEU score, and is to be compared to a preset threshold value to determine whether the current target sentence needs to be corrected.

In one example, BLEU is used to evaluate whether an n-gram word string in the current translation result is included in the previous target sentence. In such an example, in response to the n-gram word string not being included in the previous target sentence, a value of $\delta(T^i)$ is determined to be relatively small so that the difference between the current target sentence and the previous target sentence is recognized as being relatively great. Conversely, in response to the n-gram word string being included in the previous target sentence, the value of $\delta(T^i)$ is determined to be relatively large so that the difference between the current target sentence and the previous target sentence is recognized as being relatively small.

In the example illustrated in FIG. 4, the value of $\delta(T^i)$ is determined to be 0.7 in a second translation step. The determined value of $\delta(T^i)$ is less than a preset threshold value, for example, 0.8, and it is thus recognized that the difference between the current target sentence, for example, the second target sentence $T^3$ 430, and the previous target sentence, for example, the first target sentence $T^2$ 420, is great.

The machine translation apparatus then determines that the second target sentence $T^3$ 430 needs to be corrected, determines a back-translation probability of the second target sentence $T^3$ 430 being back-translated into the source sentence S 410 using the second model, and generates a third target sentence $T^4$ 440 by applying the determined back-translation probability to context information.

The machine translation apparatus determines whether the third target sentence $T^4$ 440 needs to be corrected based on a difference between the third target sentence $T^4$ 440 and previous target sentences, for example, the first target sentence $T^2$ 420 and the second target sentence $T^3$ 430. In the example illustrated in FIG. 4, the value of $\delta(T^i)$ is determined to be 1.0 in a third translation step. In this example, the determined value of $\delta(T^i)$ is greater than the threshold value, for example, 0.8, and it is thus recognized that the difference between the third target sentence $T^4$ 440 and the previous target sentences is small. The machine translation apparatus then determines that the third target sentence $T^4$ 440 does not need to be corrected, and outputs the third target sentence $T^4$ 440 as a final translation result.

FIG. 5 is a diagram illustrating an example of how a machine translation apparatus performs translation by applying, to context information, a back-translation probability of each of target sentences generated from a source sentence.

An example of how a single target sentence is generated in one translation step has been described above with FIG. 4, and an example of how a plurality of target sentences are generated in one translation step will be described hereinafter with reference to FIG. 5.

Referring to FIG. 5, a machine translation apparatus generates a plurality of first target sentences $T^{2,1}$ and $T^{2,2}$ 520 from a source sentence S 510, for example, "I ate pizza yesterday" as illustrated in FIG. 5, using a first model. For example, the first target sentences $T^{2,1}$ and $T^{2,2}$ 520 are a predetermined number of target sentences generated, with a high probability, from the source sentence S 510. In the example illustrated in FIG. 5, $Pr(T^{2,j}|S, c^2)$ denotes a probability of a j-th target sentence $T^{2,j}$ among the first target sentences $T^{2,1}$ and $T^{2,2}$ 520 being generated when the source sentence S 510 and context information $c^2$ are given.

The machine translation apparatus determines whether the first target sentences $T^{2,1}$ and $T^{2,2}$ 520, or a target sentence having a greatest probability among the first target sentences $T^{2,1}$ and $T^{2,2}$ 520, need to be corrected. The machine translation apparatus determines whether such correction is needed based on a difference between the first target sentences $T^{2,1}$ and $T^{2,2}$ 520, which are a current translation result, or the target sentence having the greatest probability among the first target sentences $T^{2,1}$ and $T^{2,2}$ 520, and a previously generated target sentence. However, there is no previous target sentence in a case of a first translation operation, and thus the machine translation apparatus determines that the correction is needed after the first translation operation.

The machine translation apparatus determines a back-translation probability of each of the first target sentences $T^{2,1}$ and $T^{2,2}$ 520 being back-translated into the source sentence S 510 using a second model. In the example illustrated in FIG. 5, $Pr(S|T^{2,j})$ denotes a back-translation probability of a j-th target sentence $T^{2,j}$ among the first target sentences $T^{2,1}$ and $T^{2,2}$ 520 being back-translated into the source sentence S 510. In this example, a back-translation probability to be determined for each of words included in the source sentence S 510, for example, $p_1^2$, $p_2^2$, $p_3^2$, and $p_4^2$, is a mean value of back-translation probabilities of corresponding words included in the first target sentences $T^{2,1}$ and $T^{2,2}$ 520. In one example, for the example illustrated in FIG. 5, the back-translation probability $p_1^2$ is determined to be a mean value of probabilities of words corresponding to "I" included in the first target sentences $T^{2,1}$ and $T^{2,2}$ 520 being translated into a word "I." The other back-translation probabilities $p_2^2$, $p_3^2$, and $p_4^2$ are also determined by the same method used to determine the back-translation probability $p_1^2$.

The machine translation apparatus retranslates the source sentence S 510 by applying the determined back-translation probabilities to context information. As discussed above, in the example illustrated in FIG. 3, the machine translation apparatus determines a back-translation probability based on a plurality of translation results in one translation step, and thus effectively reduces the number of translation steps.

When it is determined that no further correction is needed, the machine translation apparatus outputs, as a final translation result, a target sentence having a greatest probability among last target sentences.

For operations not described above with reference to FIG. 5, reference may be made to the description provided with reference to FIG. 4, and thus a more detailed and repeated description is omitted here for clarity and brevity.

FIG. 6 is a diagram illustrating an example of how a machine translation apparatus performs translation by applying, to context information, a back-translation probability and location information of a word to be generated by a decoder of a first model.

An example of how a back-translation probability is applied to context information has been described above with reference to FIG. 4, and an example of how, in addition to the back-translation probability, location information of a word to be generated by a decoder of a first model is also applied to the context information will be described hereinafter with reference to FIG. 6. In this example, a machine translation apparatus applies, to context information, a back-translation probability and location information according to Equation 3 below.

$$c_t^{i+1} = \sum_u \frac{a_{tu}^{i+1}}{p_{tu}^i}(u) \quad (3)$$

In Equation 3, $p_{tu}^i$ denotes a back-translation probability of a u-th word in a source sentence S 610, for example, "I ate pizza yesterday" as illustrated in FIG. 6, with respect to location information t of a word to be generated by the decoder of the first model in an i-th translation step. $p_{tu}^i$ may be determined according to Equation 4 below based on a dimension of a hidden vector to be extracted by an encoder of the first model.

$$p_{tu}^i[m] = \begin{cases} \sin(p_u^i + t/10000^{m/M}), & m: \text{even} \\ \cos(p_u^i + t/10000^{m/M}), & m: \text{odd} \end{cases} \quad (4)$$

In Equation 4, $p_{tu}^i[m]$ denotes a back-translation probability in an m-th dimension of the hidden vector extracted from the encoder of the first model, M denotes a total number of dimensions of the hidden vector extracted from the encoder of the first model, and m has integer values from 1 to M. The location information t indicates a location of a word in the target sentence. That is, t=1 for the first word in the target sentence, t=2 for the second word in the target sentence, and so on. The period of Equation 4 is ($2\pi \times 10000^{m/M}$). That is, location information is an M-dimensional vector having a different period for each dimension m.

As can be seen from Equation 3, the machine translation apparatus applies, to the context information for each of the words included in the source sentence S 610, a weight that is determined based on a back-translation probability of a corresponding word among the words and location information of the corresponding word to be generated by the decoder of the first model. For example, the machine translation apparatus applies a greater weight for a word having a lower back-translation probability among the words included in the source sentence S 610 to context information to be used to translate the word having the lower back-translation probability.

As illustrated in FIG. 6, among back-translation probabilities $p_1^2$, $p_2^2$, $p_3^2$, and $p_4^2$ of words included in a first target sentence $T^2$ 620 being respectively back-translated into corresponding words in the source sentence S 610, the back-translation probability $p_4^2$ of the word "yesterday" is smallest. Therefore, the machine translation apparatus applies a greater weight for the word "yesterday" to context information. The context information used herein is limited to context information used to translate the word "yesterday" based on location information of the word to be generated by the decoder of the first model. That is, the machine translation apparatus does not apply the greater weight for the word "yesterday" to context information used to translate the other words "I," "ate," and "pizza" in the source sentence S 610.

As discussed above, location information of a word to be generated by the decoder of the first model is further applied to context information. Thus, when retranslating a word that is not sufficiently accurately translated in a target sentence among the words included in the source sentence S 610, the machine translation apparatus effectively prevents the word that is not sufficiently accurately translated in the target sentence from affecting translations of the remaining words in the source sentence S 610.

Figure 7:
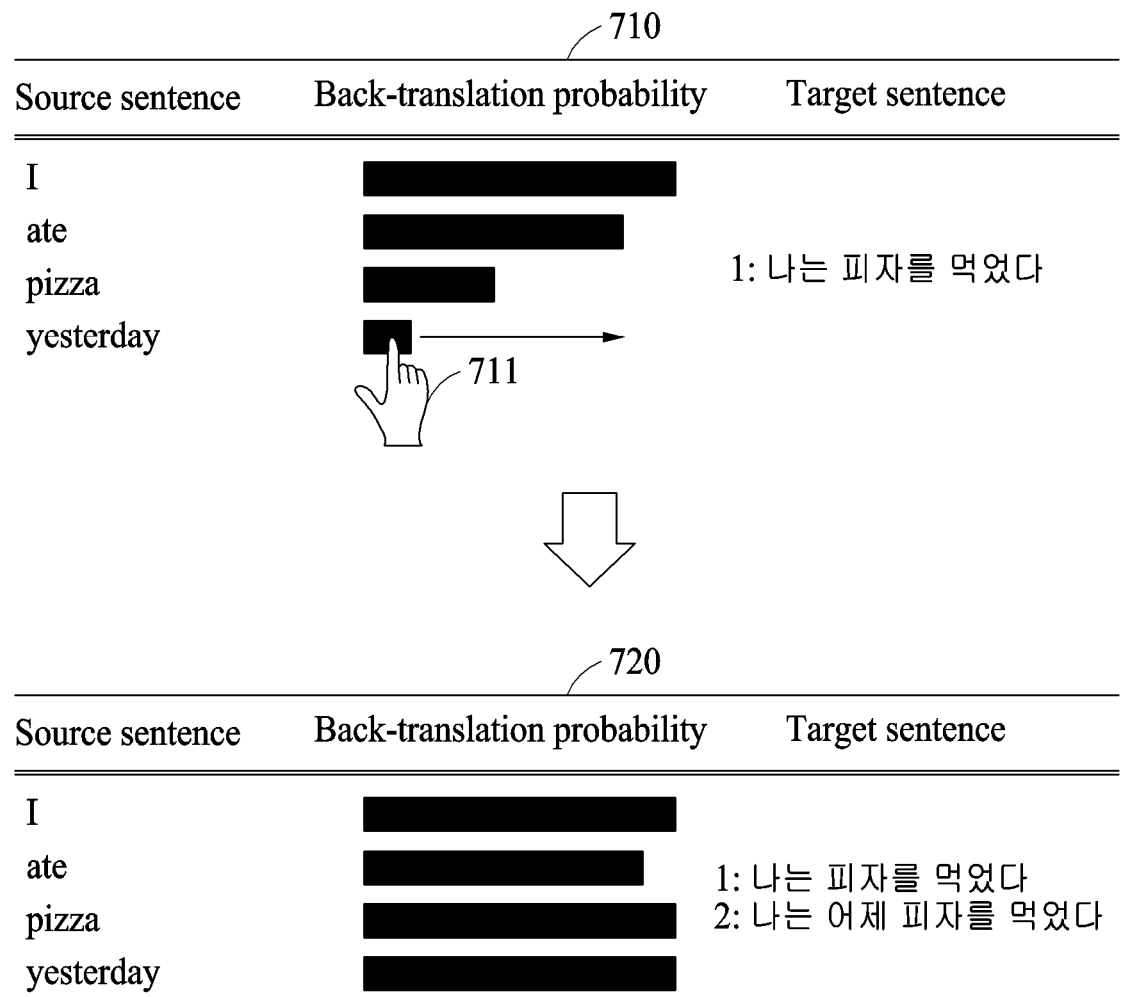
FIG. 7 is a diagram illustrating an example of a user interface.

FIG. 7 is a diagram illustrating an example of a user interface.

Referring to FIG. 7, a user interface 710 is provided by a machine translation apparatus.

The machine translation apparatus provides a user with, for example, a source sentence, a target sentence, a back-translation probability of each of the words of a current target sentence, and a number of translations of the source sentence that have been performed by the machine translation apparatus (indicated by a number before the target sentence, which is "1" in the user interface 710), through the user interface 710. The user interface 710 displays the back-translation probability for each of words included in the source sentence in a bar graph.

Referring to the bar graph displayed in the user interface 710, the user can recognize that a back-translation probability of a word "yesterday" among the words included in the source sentence is very low. The user may then enter an input 711 to change a weight for the word "yesterday" having such a low back-translation probability. For example, the user may enter the input 711 by dragging or clicking a bar in the bar graph corresponding to the word "yesterday" to change the weight for the word "yesterday," for example, to increase the weight for the word "yesterday" as illustrated in FIG. 7.

The machine translation apparatus then applies, to context information, the changed weight, for example, an increased weight as illustrated in FIG. 7, for the word "yesterday" based on the input 711 received from the user, and retranslates the source sentence using the first model and the context information to which the changed weight is applied. Referring to FIG. 7, a user interface 720 displays a second target sentence "나는 어제 피자를 먹었다" generated by retranslating the source sentence, and a back-translation probability of the second target sentence being back-translated into the source sentence for each word.

In one example, the machine translation apparatus determines whether a last translation result needs to be corrected based on a difference between the last translation result and a previous translation result. Alternatively, when an input is not received from a user to change a weight for at least one word among the words included in the source sentence, or when a command indicating that no correction is needed is received from the user, the machine translation apparatus determines that the last translation result does not need to be corrected.

As discussed above with reference to FIG. 7, by using such a user interface, a user can readily recognize whether a word in a source sentence is omitted from a target sentence, or is insufficiently accurately translated in the target sentence, and control a translation process.

Figure 8:
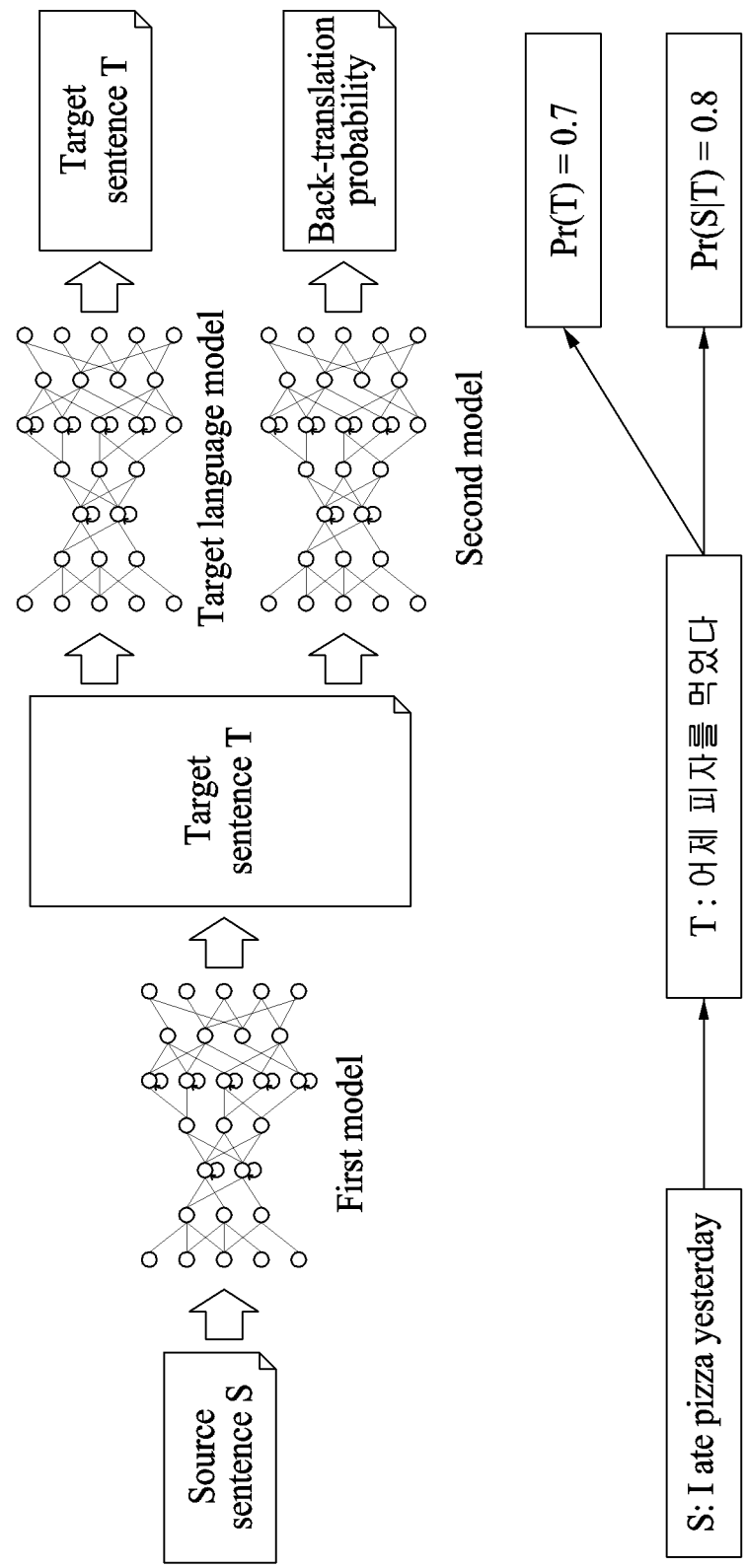
FIG. 8 is a diagram illustrating an example of how a first model and a second model are trained.

FIG. 8 is a diagram illustrating an example of how a first model and a second model are trained.

A first model and a second model used in a machine translation apparatus described above are trained based on a reward determined based on a number of translations and a degree of naturalness of a translation result. For example, the first model and the second model are trained based on reinforcement learning, for example, a policy gradient, that is based on dual learning and maximizes a reward.

For example, a number of translations of a source sentence are used to determine a reward according to Equation 5 below.

$$E[r]=\Sigma_i \lambda^i r^i \qquad (5)$$

In Equation 5, r denotes a reward, and λ denotes a value between 0 and 1 that decreases as a number of translations i increases. The reward r is a probability $Pr(S|T^i)$ that a target sentence translated from a source sentence using the first model in an i-th translation step is back-translated into the source sentence using the second model. The first model and the second model are trained to maximize a value of an expected reward E[r], and thus are trained so that a greater reward is applied for a smaller number of translations of the source sentence.

In addition, the degree of naturalness of a translation result in a target language is determined using a target language model. The first model and the second model are trained so that a greater reward is applied when the translation result corresponds to a more natural expression in the target language.

Figure 9:
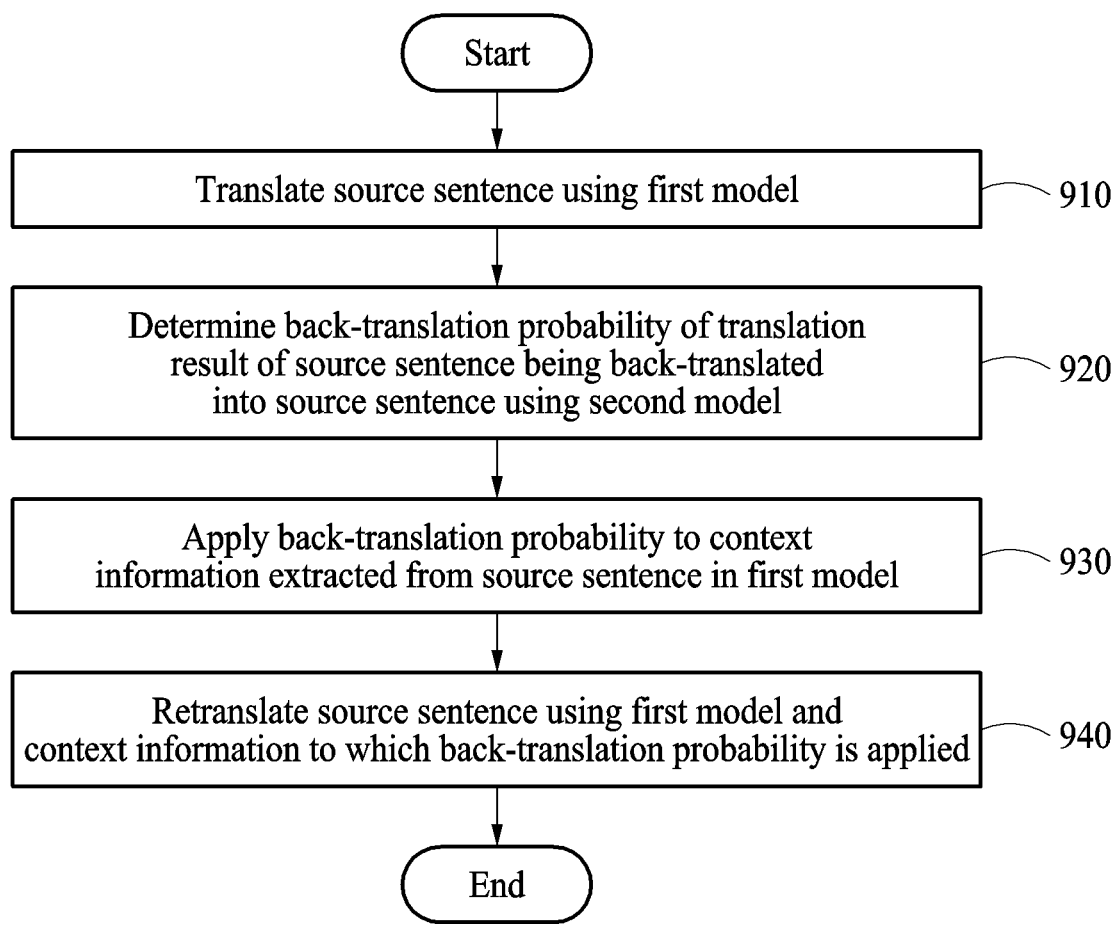
FIG. 9 is a flowchart illustrating an example of a machine translation method.

FIG. 9 is a flowchart illustrating an example of a machine translation method.

The machine translation method to be described hereinafter with reference to FIG. 9 is performed by a processor of a machine translation apparatus.

Referring to FIG. 9, in operation 910, the machine translation apparatus translates a source sentence using a first model.

In operation 920, the machine translation apparatus determines a back-translation probability of a translation result of the source sentence being back-translated into the source sentence using a second model.

In operation 930, the machine translation apparatus applies the determined back-translation probability to context information extracted from the source sentence in the first model.

In operation 940, the machine translation apparatus retranslates the source sentence using the first model and the context information to which the back-translation probability is applied.

The descriptions provided with reference to FIGS. 1 through 8 are applicable to the machine translation method described above with reference to FIG. 9, and thus a more detailed and repeated description is omitted here for clarity and brevity.

Figure 10:
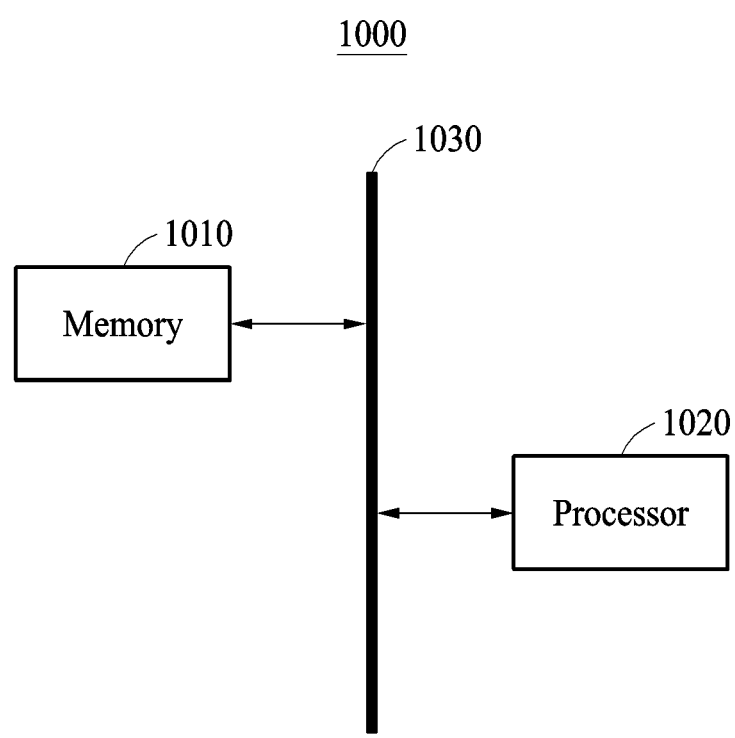
FIG. 10 is a diagram illustrating an example of a machine translation apparatus.

FIG. 10 is a diagram illustrating an example of a machine translation apparatus.

Referring to FIG. 10, a machine translation apparatus 1000 includes a memory 1010 and a processor 1020. The memory 1010 and the processor 1020 communicate with each other through a bus 1030.

The memory 1010 stores at least one instruction to be executed by the processor 1020. The processor 1020 performs the operations described herein when the processor 1020 executes the at least one instruction stored in the memory 1010. The memory 1010 may include either one or both of a volatile memory and a nonvolatile memory.

The processor 1020 is a device capable of executing the at least one instruction stored in the memory 1010 to control operations of the machine translation apparatus 1000. The processor 1020 executing the at least one instruction stored in the memory 1010 configures the processor 1020 to translate a source sentence using a first model, determine a back-translation probability of a translation result of the source sentence being back-translated into the source sentence using a second model, apply the determined back-translation probability to context information extracted from the source sentence in the first model, and retranslate the source sentence using the first model and the context information to which the back-translation probability is applied.

In one example, the machine translation apparatus 1000 is combined with a voice recognizer or synthesizer, and applied to interpretation and translation services without restrictions.

For a more detailed description of the machine translation apparatus 1000, reference may be made to the descriptions provided above with respect to FIGS. 1 through 9, and thus a more detailed and repeated description is omitted here for clarity and brevity.

The machine translation apparatus 1000, the memory 1010, the processor 1020, and the bus 1030 in FIG. 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented machine translation method comprising:
   translating a source sentence using a first model;
   determining a back-translation probability of a translation result of the source sentence being back-translated into the source sentence using a second model;
   applying the back-translation probability to context information extracted from the source sentence in the first model; and
   retranslating the source sentence using the first model and the context information to which the back-translation probability is applied,
   wherein the back-translation probability is determined for each of words included in the source sentence.

2. The processor-implemented machine translation method of claim 1, wherein the applying of the back-translation probability to the context information comprises applying, to the context information, a greater weight for a word having a lower back-translation probability among words included in the source sentence.

3. The processor-implemented machine translation method of claim 1, wherein the applying of the back-translation probability to the context information comprises applying, to the context information for each of words included in the source sentence, a weight determined based on a back-translation probability of a corresponding word included in the translation result and location information of the corresponding word in the translation result.

4. The processor-implemented machine translation method of claim 3, wherein the applying of the back-translation probability to the context information comprises applying a greater weight for a word having a lower back-translation probability among the words included in the source sentence to context information to be used to translate the word using the first model.

5. The processor-implemented machine translation method of claim 1, further comprising:
   determining whether a last translation result of the source sentence needs to be corrected; and
   in response to a result of the determining being that the last translation result of the source sentence needs to be corrected:
      applying, to the context information, a back-translation probability of the last translation result being back-translated into the source sentence, and
      retranslating the source sentence using the first model and the context information to which the back-translation probability is applied.

6. The processor-implemented machine translation method of claim 5, wherein the determining of whether the last translation result needs to be corrected comprises determining whether the last translation result needs to be corrected based on a difference between the last translation result of the source sentence and a previous translation result of the source sentence.

7. The processor-implemented machine translation method of claim 1, wherein the applying of the back-translation probability to the context information comprises:
   providing a user with the back-translation probability for each of words included in the source sentence;
   receiving, from the user, a user input to change a weight for a word among the words included in the source sentence; and
   applying, to the context information, the changed weight for the word in response to the received user input.

8. The processor-implemented machine translation method of claim 1, wherein the translation result comprises a plurality of target sentences obtained by translating the source sentence using the first model, and
   the determining of the back-translation probability comprises determining, to be the back-translation probability, a mean value of respective probabilities of the target sentences being back-translated into the source sentence.

9. The processor-implemented machine translation method of claim 1, wherein the first model and the second model are trained to maximize an expected reward that increases as a number of times the source sentence is retranslated decreases.

10. The processor-implemented machine translation method of claim 1, wherein the first model and the second model are trained to maximize an expected reward that increases as a number of times the source sentence is retranslated decreases and as a degree of naturalness of the translation result in a target language increases.

11. The processor-implemented machine translation method of claim 1, wherein the first model is configured to generate a translation result expressed in a target language from a source sentence expressed in a source language, and
   the second model is configured to generate a back-translation probability of the translation result expressed in the target language being back-translated into the source sentence expressed in the source language.

12. A non-transitory computer-readable medium storing instructions that, when executed by a processor, cause the processor to perform the processor-implemented machine translation method of claim 1.

13. A machine translation apparatus comprising:
a processor; and
a memory storing at least one instruction to be executed by the processor,
wherein the processor executing the at least one instruction configures the processor to:
translate a source sentence using a first model;
determine a back-translation probability of a translation result of the source sentence being back-translated into the source sentence using a second model;
apply the back-translation probability to context information extracted from the source sentence in the first model; and
retranslate the source sentence using the first model and the context information to which the back-translation probability is applied,
wherein the processor is further configured to determine the back-translation probability for each of words included in the source sentence.

14. The machine translation apparatus of claim 13, wherein the processor is further configured to apply, to the context information, a greater weight for a word having a lower back-translation probability among words included in the source sentence.

15. The machine translation apparatus of claim 13, wherein the processor is further configured to apply, to the context information for each of words included in the source sentence, a weight determined based on a back-translation probability of a corresponding word included in the translation result and location information of the corresponding word in the translation result.

16. The machine translation apparatus of claim 15, wherein the processor is further configured to apply a greater weight for a word having a lower back-translation probability among the words included in the source sentence to context information to be used to translate the word using the first model.

17. The machine translation apparatus of claim 13, wherein the processor is further configured to:
determine whether a last translation result of the source sentence needs to be corrected; and
in response to a determination that the last translation result needs to be corrected:
apply, to the context information, a back-translation probability of the last translation result being back-translated into the source sentence, and
retranslate the source sentence using the first model and the context information to which the back-translation probability is applied.

18. The machine translation apparatus of claim 13, wherein the processor is further configured to:
provide a user with the back-translation probability for each of words included in the source sentence;
receive, from the user, a user input to change a weight for a word among the words included in the source sentence; and
apply, to the context information, the changed weight for the word in response to the received user input.

19. A processor-implemented machine translation method comprising:
translating a source sentence comprising words based on context information of the words of the source sentence using a first model to obtain a target sentence;
determining a back-translation probability of the target sentence being back-translated into the source sentence using a second model;
applying the back-translation probability to the context information to obtain modified context information; and
retranslating the source sentence based on the modified context information using the first model to obtain an updated target sentence.

20. The processor-implemented machine translation method of claim 19, wherein the target sentence comprises words,
the determining of the back-translation probability comprises determining, for each of the words of the source sentence, a back-translation probability of a corresponding word of the target sentence being back-translated into the word of the source sentence, and
the applying of the back-translation probability comprises applying an inverse of the back-translation probability determined for each of the words of the source sentence to the context information to obtain the modified context information.

21. The processor-implemented machine translation method of claim 19, wherein the target sentence comprises words,
the determining of the back-translation probability comprises determining, for each of the words of the source sentence, a back-translation probability of a corresponding word of the target sentence being back-translated into the word of the source sentence, and
the applying of the back-translation probability comprises applying, for each of the words of the source sentence, the back-translation probability determined for the word of the source sentence and location information of the corresponding word of the target sentence to the context information to obtain the modified context information.

22. The processor-implemented machine translation method of claim 19, wherein the translating of the source sentence comprises translating the source sentence based on the context information using the first model to obtain a first target sentence and a second target sentence different from the first target sentence,
the determining of the back-translation probability comprises:
determining a first back-translation probability of the first target sentence being back-translated into the source sentence using the second model, and
determining a second back-translation probability of the second target sentence being back-translated into the source sentence using the second model, and
the applying of the back-translation probability comprises applying a mean value of the first back-translation probability and the second back-translation probability to the context information to obtain the modified context information.

23. The processor-implemented machine translation method of claim 19, further comprising determining whether a difference between the updated target sentence and the source sentence satisfies a predetermined condition indicating that the updated target sentence is a sufficiently accurate translation of the source sentence;
in response to the difference not satisfying the predetermined condition, repeating the determining of the back-translation probability, the applying of the back-translation probability, the retranslating of the source sentence, and the determining of whether the difference satisfies the predetermined condition until the difference satisfies the predetermined condition; and in response to the difference satisfying the predetermined condition, outputting the updated target sentence as a final translation result of translating the source sentence.

* * * * *